United States Patent
Matsuo

(10) Patent No.: US 8,400,418 B2
(45) Date of Patent: Mar. 19, 2013

(54) CAPACITANCE TYPE INPUT DEVICE AND DISPLAY DEVICE WITH INPUT FUNCTION

(75) Inventor: Mutsumi Matsuo, Azumino (JP)

(73) Assignee: Sony Corporation, Tokyo (JP)

( * ) Notice: Subject to any disclaimer, the term of this patent is extended or adjusted under 35 U.S.C. 154(b) by 485 days.

(21) Appl. No.: 12/417,157

(22) Filed: Apr. 2, 2009

(65) Prior Publication Data

US 2009/0315854 A1   Dec. 24, 2009

(30) Foreign Application Priority Data

Jun. 18, 2008   (JP) ................... 2008-158834

(51) Int. Cl.
    *G06F 3/045* (2006.01)

(52) U.S. Cl. ..................................... 345/174; 178/18.06

(58) Field of Classification Search ......................... None
See application file for complete search history.

(56) References Cited

U.S. PATENT DOCUMENTS

| | | | | |
|---|---|---|---|---|
| 2008/0309633 A1* | 12/2008 | Hotelling et al. | ............. | 345/173 |
| 2009/0085885 A1* | 4/2009 | Wu et al. | ........................ | 345/173 |
| 2009/0213090 A1* | 8/2009 | Mamba et al. | ................. | 345/174 |

FOREIGN PATENT DOCUMENTS

| | | |
|---|---|---|
| JP | 11-154053 | 6/1999 |
| JP | 2008-129708 | 6/2008 |
| JP | 2009-205321 | 9/2009 |

* cited by examiner

*Primary Examiner* — Andrew L Sniezek
(74) *Attorney, Agent, or Firm* — K&L Gates LLP

(57) ABSTRACT

Provided is a capacitance type input device, in which a plurality of first light transmission electrodes extending in a first direction and a plurality of second light transmission electrodes extending in a second direction crossing the first direction are formed in an input region of a light transmission substrate, wherein, when the light transmission substrate is viewed from the top, dummy patterns formed of the same light transmission conductive film as the first light transmission electrodes and the second light transmission electrodes are formed in regions sandwiched between the first light transmission electrodes and the second light transmission electrodes.

11 Claims, 12 Drawing Sheets

CAPACITANCE TYPE INPUT DEVICE AND DISPLAY DEVICE WITH INPUT FUNCTION

The entire disclosure of Japanese Patent Application No. 2008-158834, filed Jun. 18, 2008 is expressly incorporated by reference herein.

BACKGROUND

1. Technical Field

The present invention relates to a capacitance type input device capable of detecting an approach position of a finger by a capacitance variation and a display device with an input function, which includes the capacitance type input device.

2. Related Art

In electronic apparatuses such as mobile telephones, car navigation systems, personal computers, ticket vending machines, bank terminals or the like, recently, there is provided an electronic apparatus in which a tablet input device is arranged on a surface of a liquid crystal device or the like, and a finger or the like is brought into contact with a place where a pointed image is displayed, while referring to the pointed image displayed in an image display region of the liquid crystal device, so as to input information corresponding to the pointed image.

Such an input device (touch panel) includes a resistance film type input device, a capacitance type input device, and so on. Since the resistance film type input device has a double sheet structure including a film and glass and a structure in which a film is pressed to short-circuit, the resistance film type input device has problems such as a narrow operation temperature range and weak time variation.

In contrast, the capacitance type input device has an advantage that light transmission conductive films are formed in one substrate. Such a capacitance type input device includes, for example, an input device in which electrode patterns extend in directions which are perpendicular to each other and a capacitance variation between the electrodes when a finger or the like is contacted is detected so as to detect an input position (for example, see JP-A-11-154053).

When a liquid crystal device or the like is arranged so as to be superposed on the input device, since an image displayed by the liquid crystal device is transmitted from an input surface side of the input device and is viewed, the substrate and the electrode patterns with an excellent light transmission property are used. However, if a region in which the light transmission electrode patterns or the like are formed and a region in which the light transmission electrode patterns or the like are not formed are significantly different from each other in reflectivity, the existence of the light transmission electrode patterns is unpreferably conspicuous.

However, if a first light transmission electrode pattern and a second light transmission electrode pattern are respectively formed on the front surface and the rear surface of the light transmission substrate, since the light transmission substrate is interposed between the first light transmission electrode pattern and the second light transmission electrode pattern, the region in which the first light transmission electrode pattern is formed, the region in which the second light transmission electrode pattern is formed, and the region in which these light transmission electrode patterns are not formed are significantly different from one another in the optical configuration and thus a significant difference among the regions occurs in reflectivity. Accordingly, the existence of the light transmission electrode pattern is conspicuous.

Even when the first light transmission electrode pattern and the second light transmission electrode pattern are formed on the same surface of the light transmission substrate, since a glass substrate which is generally used in the light transmission substrate and an indium tin oxide (ITO) film which is generally used in the light transmission electrode pattern are different from each other in a refractive index, a difference between the region in which the light transmission electrode pattern is formed and the region in which the light transmission electrode pattern is not formed occurs in reflectivity and thus the existence of the light transmission electrode pattern is unpreferably conspicuous.

SUMMARY

An advantage of some aspects of the invention is that it provides a capacitance type input device capable of making a light transmission electrode pattern on a light transmission substrate inconspicuous by a simple configuration, and a display device with an input function.

According to an aspect of the invention, there is provided a capacitance type input device, in which a plurality of first light transmission electrodes extending in a first direction and a plurality of second light transmission electrodes extending in a second direction crossing the first direction are formed in an input region of a light transmission substrate, wherein, when the light transmission substrate is viewed from the top, dummy patterns formed of the light transmission film having the same refractive index as the first light transmission electrodes and the second light transmission electrodes are formed in regions sandwiched between the first light transmission electrodes and the second light transmission electrodes.

In the capacitance type input device, when the light transmission substrate is viewed from the top, the input region includes the region in which the light transmission conductive film configuring the first light transmission electrodes and the second light transmission electrodes is present and the region in which this light transmission conductive film is not present, and there is a difference in reflectivity between these regions. Accordingly, the existence of the first light transmission electrodes and the second light transmission electrodes is conspicuous. However, in the present embodiment, in the region in which the light transmission conductive film configuring the first light transmission electrodes and the second light transmission electrodes is not present, the dummy patterns formed of the same light transmission conductive film as the first light transmission electrodes and the second light transmission electrodes are formed. Accordingly, according to the invention, since a region in which all the first light transmission electrodes, the second light transmission electrodes and the dummy patterns are not present is very narrow, the existence of the first light transmission electrodes and the second light transmission electrodes is inconspicuous. Therefore, even when an image generating device is arranged so as to be overlapped on a side opposite to an input surface of the capacitance type input device, it is possible to provide an image with high quality to a person who views the image generating device via the capacitance type input device.

In the invention, the first light transmission electrodes and the second light transmission electrodes may be formed of a single layer film. The first light transmission electrodes and the second light transmission electrodes may be formed of a multi-layer film as the configuration in which the existence of the first light transmission electrodes and the second light transmission electrodes is inconspicuous. However, if such a configuration is employed, in many cases, an insulating film may be included in the multi-layer film. Accordingly, the electrical resistance of the first light transmission electrodes and the second light transmission electrodes is increased. However, according to the invention, even when the first light transmission electrodes and the second light transmission electrodes are formed of the single layer film, the existence of the first light transmission electrodes and the second light transmission electrodes is inconspicuous. Therefore, the electrical resistance of the first light transmission electrodes and the second light transmission electrodes can be decreased. In addition, since a manufacturing process can be simplified, cost can be also reduced.

In the invention, the first light transmission electrodes, the second light transmission electrodes and the dummy patterns may be formed of the same light transmission conductive film at the same surface side of the light transmission substrate, and the dummy patterns may be formed in a state of being insulated from both the first light transmission electrodes and the second light transmission electrodes. By this configuration, since the light transmission substrate is not interposed between the first light transmission electrodes and the second light transmission electrodes, the region in which the first light transmission electrodes are formed, the region in which the second light transmission electrodes are formed, and the region in which such light transmission electrodes are not formed are not significantly different from one another in the optical configuration. Accordingly, a difference in reflectivity between the regions is small. Therefore, the existence of the first light transmission electrodes and the second light transmission electrodes is inconspicuous.

In the invention, the first light transmission electrodes, the second light transmission electrodes and the dummy patterns may be formed of the same light transmission conductive film on the same insulating layer at the same surface side of the light transmission substrate. By this configuration, since the first light transmission electrodes, the second light transmission electrodes and the dummy patterns can be simultaneously formed, a manufacturing process can be simplified and thus cost can be reduced.

In the invention, the first light transmission electrodes and the second light transmission electrodes may include large-area portions in regions sandwiched between crossing portions of the first light transmission electrodes and the second light transmission electrodes, respectively. In this case, a plurality of slit-shaped gaps sandwiched between the large-area portions may be formed between the first light transmission electrodes and the second light transmission electrodes, and the dummy patterns may be formed in the gaps.

In the invention, the dummy patterns may be independently formed in each of the plurality of gaps. By this configuration, even when the dummy patterns are formed of a light transmission conductive film, the electrical influence of the dummy patterns does not occur. Therefore, it is advantageous in that detection sensitivity of the input position is high.

In the invention, a plurality of dummy patterns may extend in each of the gaps in the longitudinal direction of the gaps in a state of being parallel to each other in the width direction of the gaps. By this configuration, in the case where the dummy patterns are formed of the light transmission conductive film, the parasitic capacitance between the first light transmission electrodes and the second light transmission electrodes with the dummy patterns interposed therebetween is smaller than that of the case where one dummy pattern is present between the first light transmission electrodes and the second light transmission electrodes.

In the invention, a plurality of dummy patterns may be arranged in one of the slit-shaped gaps in a state of being divided in the longitudinal direction of the gaps. By this configuration, in the case where the dummy patterns are formed of the light transmission conductive film, since the electrical influence of the dummy patterns is small compared with the case where the dummy patterns extend between the first light transmission electrodes and the second light transmission electrodes, it is advantageous in that the detection sensitivity of the input position can be increased.

In the invention, in the width direction of the gaps, the widths of spaces formed between the large-area portions and the dummy patterns may be 30 µm or less and the sum of the widths of the spaces may be 50 µm or less. By this configuration, in the gaps, the region in which all the first light transmission electrodes, the second light transmission electrodes and the dummy patterns are not present is inconspicuous.

In the invention, in the crossing portions, ones of the first light transmission electrodes and the second light transmission electrodes may be connected to each other and the others thereof may be disconnected from each other, a light transmission interlayer insulating film may be formed on an upper layer side or a lower layer side of ones of the first light transmission electrodes and the second light transmission electrodes in at least the crossing portions, and, at a side opposite to a side, on which the first light transmission electrodes and the second light transmission electrodes are formed, of the upper layer side and the lower layer side of the interlayer insulating film, light transmission relay electrodes for electrically connecting the others of the first light transmission electrodes and the second light transmission electrodes, which are disconnected in the crossing portions, may be formed. When the first light transmission electrodes and the second light transmission electrodes are formed on the same surface of the light transmission substrate, the first light transmission electrodes and the second light transmission electrodes need to cross each other, and the film configuration of such crossing portions are different from that of the first light transmission electrodes and the second light transmission electrodes. Accordingly, even when the light transmission electrodes are formed such that a difference in reflectivity between the region in which the light transmission electrodes and so on are formed and the region in which the light transmission electrodes and so on are not formed is decreased when the image displayed by the liquid crystal device or the like is viewed from the input surface side of the input device so as to make the light transmission electrodes inconspicuous, the crossing portions become conspicuous. However, in the invention, the light transmission electrodes are disconnected at the crossing portions and the disconnected light transmission electrodes are electrically connected by the light transmission relay electrodes formed on the light transmission interlayer insulating film. Accordingly, the area occupied by the crossing portions is small. Therefore, the existence of the crossing portions is inconspicuous when being viewed from the input surface side.

The capacitance type input device according to the invention may be used in a display device with an input function, and, in this case, an image generating device is arranged so as to be overlapped on a side opposite to an input surface of the capacitance type input device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
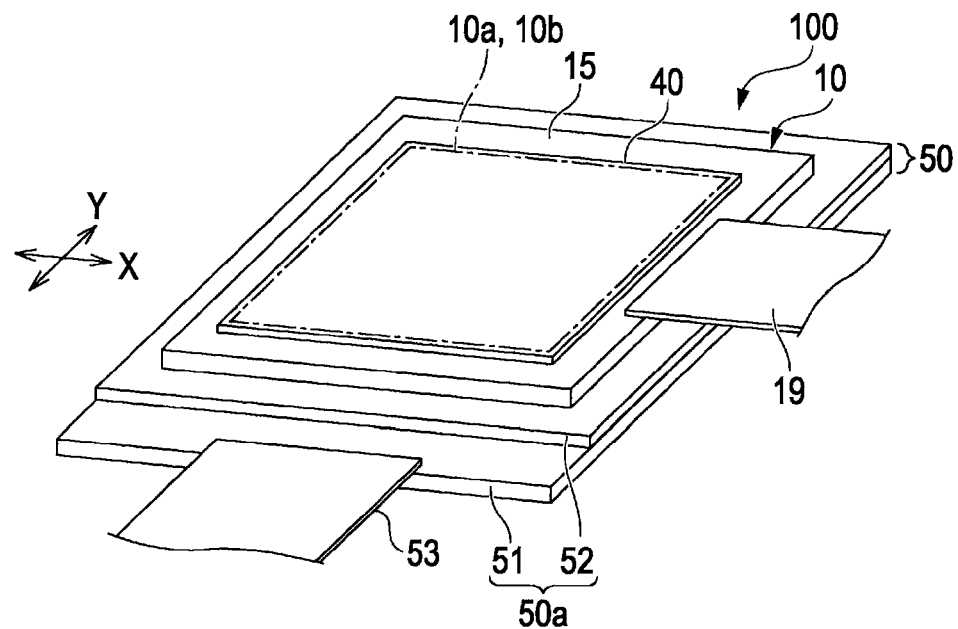
FIGS. 1A and 1B are explanation views schematically showing the configuration of a display device with an input device according to the invention and an explanation view schematically showing the planar configuration of the display device with the input device, respectively.

The embodiments of the invention will be described with reference to the accompanying drawings. In each view used for following description, the scale of each layer or each member is differentiated from each other in order that each layer or each member has a size capable of being identified in the drawing.

Embodiment 1

Whole Configuration

Figure 1B:
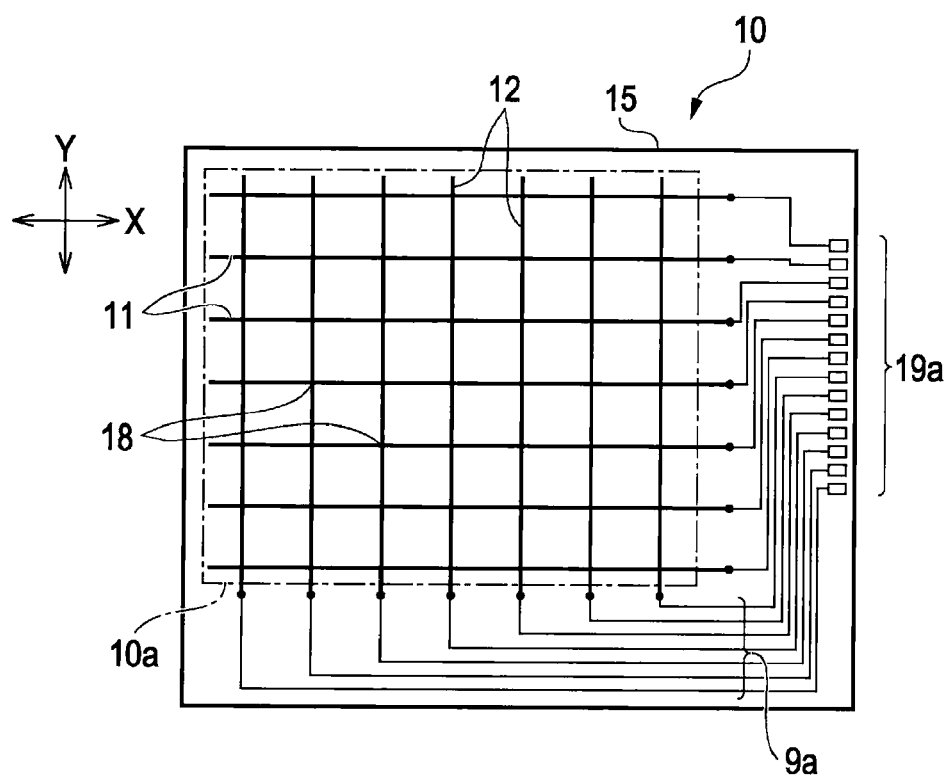

FIGS. 1A and 1B are explanation views schematically showing the configuration of a display device with an input device according to the invention and an explanation view schematically showing the planar configuration of the display device with the input device, respectively. In FIG. 1B, first light transmission electrode patterns and second light transmission electrode patterns are simplified by a solid line and the number of electrode patterns is reduced.

In FIG. 1A, a display device 100 with an input device according to the present embodiment generally includes a liquid crystal device 50 as an image generating device and an input device 10 (touch panel) which has a panel shape and is arranged so as to be overlapped on a display light emitting side surface of the liquid crystal device 50. The liquid crystal device 50 includes a transmissive type, reflective type, or transflective type active matrix liquid crystal panel 50a. In a transmissive type or transreflective type liquid crystal panel, a backlight device (not shown) is arranged on a side opposite to a light-emitting side of the display light. In addition, in the liquid crystal device 50, a retardation film or a polarization plate (not shown) is arranged so as to be overlapped on the liquid crystal panel 50a. The liquid crystal panel 50a includes a device substrate 51, a counter substrate 52 which faces the device substrate 51, and a liquid crystal layer held between the counter substrate 52 and the device substrate 51. On the device substrate 51, a flexible substrate 53 is connected in a region protruding from an edge of the counter substrate 52. On the device substrate 51, a driving IC may be COG-mounted. In either case, the liquid crystal device 50 can display a moving image or a still image, and displays a pointed image corresponding to input information when an input is performed with respect to the display device 100 with the input device. Accordingly, when a user touches a pointed image displayed by the display device 100 with the input device with a finger or brings a finger close to a pointed image, the input of information can be performed.

The input device 10 is a capacitance type touch panel and includes a light transmission substrate 15, a light transmission cover substrate 40 adhered to the light transmission substrate 15 with an adhesive layer (light transmission resin layer) (which will be described below) interposed therebetween, and a flexible substrate 19 connected to an end of the light transmission substrate 15. A driving circuit (not shown) for detecting an input position in the input device 10 is connected to the flexible substrate 19. In the input device 10, an input surface 10b is configured by an upper surface of the cover substrate 40, and a substantially central region of the light transmission substrate 15 becomes an input region 10a in which an input with the tip of a finger is performed.

As shown in FIG. 1B, in the input surface 10b of the light transmission substrate 15, a plurality of rows of first light transmission electrode patterns 11 extending in a first direction denoted by an arrow X and a plurality of rows of second light transmission electrode patterns 12 extending in a second direction crossing the first direction and denoted by an arrow Y are formed in the input region 10a. In the input device 10 having such a configuration, if a finger which is a conductive material is brought into contact with or is brought close to several places when voltages and charges are sequentially applied to the plurality of first light transmission electrode patterns 11 and the plurality of second light transmission electrode patterns 12, capacitance occurs between the finger and the first light transmission electrode pattern 11 and the second light transmission electrode pattern 12. As a result, since capacitance deteriorates, it is possible to detect which place the finger is brought into contact with.

Detailed Configuration of Input Device 10

Figure 2A:
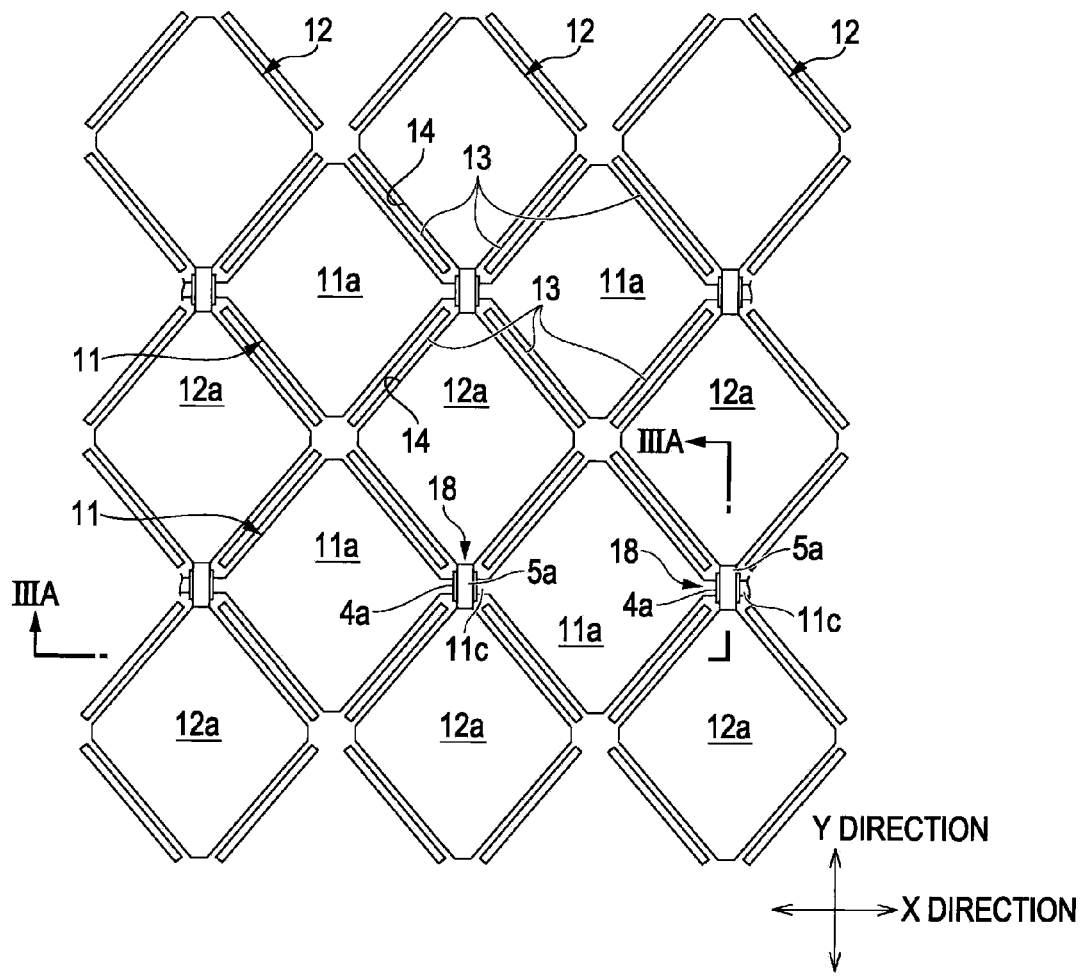
FIGS. 2A and 2B are explanation views showing the planar configuration of light transmission electrode patterns formed in an input device according to Embodiment 1 of the invention and an enlarged plan view showing gaps of first light transmission electrode patterns and second light transmission electrode patterns, respectively.
Figure 2B:
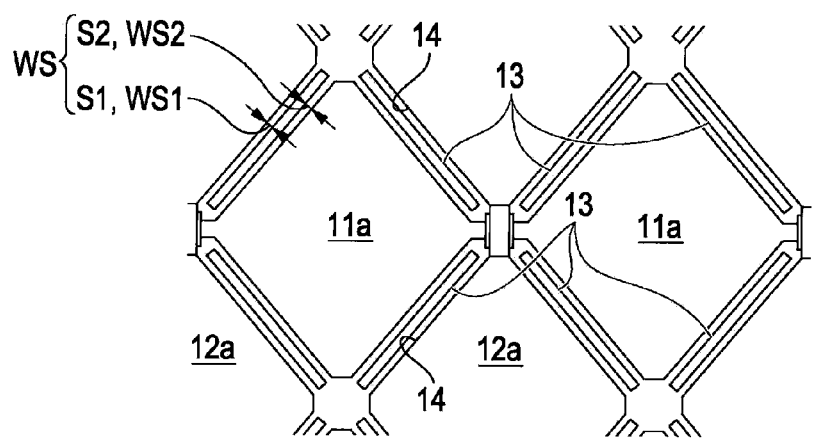
Figure 3A:
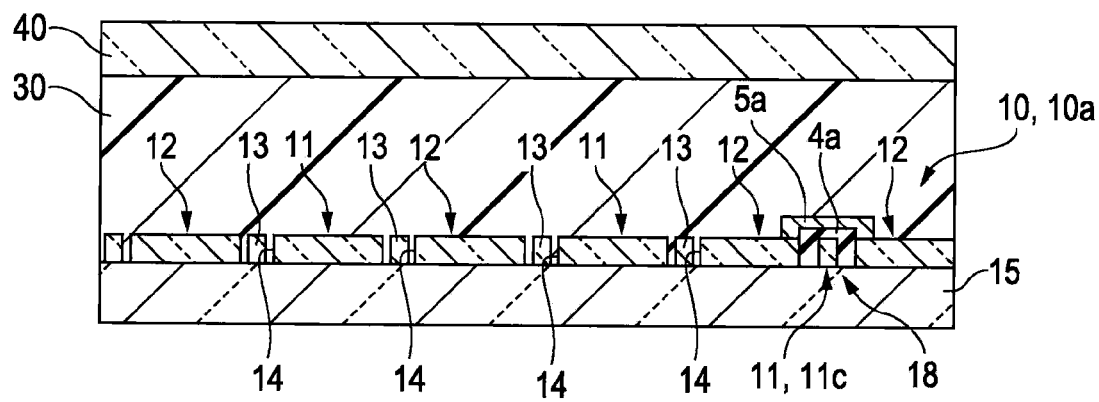
FIGS. 3A and 3B are cross-sectional views taken along line IIIA-IIIA of the input device according to Embodiment 1 of the invention and a cross-sectional view showing a connection structure of light transmission electrode patterns and metal wires, respectively.
Figure 3B:
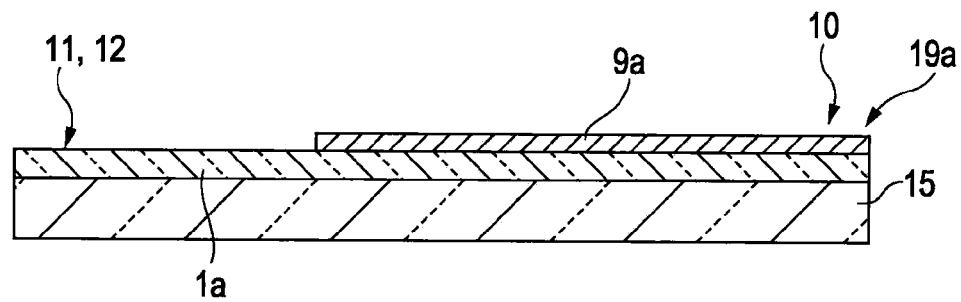

FIGS. 2A and 2B are explanation views showing the planar configuration of a light transmission electrode pattern (the first light transmission electrode pattern and the second light transmission electrode pattern) formed in an input device according to Embodiment 1 of the invention and an enlarged plan view showing gaps of first light transmission electrode pattern and second light transmission electrode patterns, respectively. FIGS. 3A and 3B are cross-sectional views taken along line IIIA-IIIA of FIG. 2A of the input device according to Embodiment 1 of the invention and a cross-sectional view showing a connection structure of light transmission electrode patterns and metal wires, respectively. In FIG. 2A, only portions of the first light transmission electrode patterns and the second light transmission electrode patterns are shown.

As shown in FIGS. 1B, 2A and 3A, in the input device 10 according to the present embodiment, the first light transmission electrode patterns 11 and the second light transmission electrode patterns 12 are formed of a light transmission conductive film such as an ITO film at the same surface side of the light transmission substrate 15. In the present embodiment, in the input region 10a of the light transmission substrate 15, since the first light transmission electrode patterns 11 and the second light transmission electrode patterns 12 are formed of the same light transmission conductive film on the same insulating layer (on the light transmission substrate 15) at the same surface side of the light transmission substrate 15, a plurality of crossing portions 18 of the first light transmission electrode patterns 11 and the second light transmission electrode patterns 12 is present.

In the present embodiment, in each of the plurality of crossing portions 18, ones of the first light transmission electrode pattern 11 and the second light transmission electrode pattern 12 are connected to each other in the crossing portions 18 and the others thereof are disconnected from each other. In the present embodiment, in each of the plurality of crossing portions 18, the first light transmission electrode patterns 11 are connected to each other and the second light transmission electrode patterns 12 are disconnected from each other.

A light transmission interlayer insulating film 4a is formed on the upper layer side of the first light transmission electrode pattern 11 of each of the crossing portions 18, and light transmission relay electrodes 5a for electrically connecting the second light transmission electrode patterns 12, which are disconnected in each of the crossing portions 18, are formed on the interlayer insulating film 4a. Accordingly, the second light transmission electrode patterns 12 are electrically connected in the second direction.

The first light transmission electrode patterns 11 and the second light transmission electrode patterns 12 respectively include large-area pad portions 11a and 12a (large-area portions) having a rhombic shape in regions sandwiched between the crossing portions 18, and connection portions 11c located at the crossing portions 18 in the first light transmission electrode patterns 11 have a width narrower than that of the pad portions 11a. The relay electrodes 5a are also formed so as to have a rectangular shape and have a width narrower than that of the pad portions 12a.

In the input region 10a having such a configuration, the light transmission cover substrate 40 is laminated with the adhesive layer 30 interposed therebetween.

In the input device 10 having such a configuration, the materials, the thicknesses t, and the refractive indexes n of the elements are as follows:

Light transmission substrate 10: glass (t=0.5 mm, n=1.52)
First light transmission electrode pattern 11: ITO film (t=10 to 100 nm, n=1.8 to 1.9)
Second light transmission electrode pattern 12: ITO film (t=10 to 100 nm, n=1.8 to 1.9)
Interlayer insulating film 4a: acrylic resin (t=1.5 µm, n=1.52) Relay electrode: ITO film (t=10 to 50 nm, n=1.8 to 1.9) Adhesive layer 30: acrylic resin (t=200 µm, n=1.48) Cover substrate 40: glass (t=0.5 mm, n=1.52)

As shown in FIGS. 1A, 1B and 3B, in the outer region of the input region 10a of the light transmission substrate 15, a wire lead-out portion 1a extends from the first light transmission electrode patterns 11 and the second light transmission electrode patterns 12, and metal wires 9a are formed on the wire lead-out portion 1a. Ends of the metal wires 9a configure a terminal 19a for connecting the flexible substrate 19.

Configuration of Dummy Pattern

As shown in FIGS. 2A, 2B and 3A, in the input device 10 according to the present embodiment, when the light transmission substrate 15 is viewed from the top, dummy patterns 13 formed of a light transmission film and having the same refractive index as the first light transmission electrode patterns 11 and the second light transmission electrode patterns 12 are formed in the region sandwiched between the first light transmission electrode patterns 11 and the second light transmission electrode patterns 12.

In more detail, the first light transmission electrode patterns 11 and the second light transmission electrode patterns 12 respectively include the large-area pad portions 11a and 12a (large-area portions) having the rhombic shape in the regions sandwiched between the crossing portions 18, and slit-shaped gaps 14 are formed between the pad portions 11a and 12a. In the present embodiment, the dummy patterns 13 are formed in the gaps 14 sandwiched between the pad portions 11a and 12a.

The first light transmission electrode patterns 11 and the second light transmission electrode patterns 12 are formed of a single layer film of an ITO film (light transmission conductive film) on the light transmission substrate 15, and the dummy patterns 13 are also formed of the ITO film which is simultaneously formed on the light transmission substrate 15 with the first light transmission electrode patterns 11 and the second light transmission electrode patterns 12. The dummy patterns 13 extend in the longitudinal direction of the gaps 14 so as to pass through the width-direction central portions of the gaps 14 with the same distance from the pad portions 11a and 12a. Accordingly, the dummy patterns 13 are not in contact with the first light transmission electrode patterns 11 and the second light transmission electrode patterns 12 and are in an electrically float state. The plurality of gaps 14 extend on a substantially same line, and the dummy patterns 13 are independently formed in the plurality of gaps 14.

As shown in FIG. 2B, in the gaps 14, the respective widths WS1 and WS2 of the spaces S1 and S2 of the ITO film configuring the first light transmission electrode patterns 11, the second light transmission electrode patterns 12 and the dummy patterns 13 are set to 30 µm or less and the sum WS of the respective widths WS1 and WS2 of the spaces S1 and S2 of the ITO film is set to 50 µm or less.

Method of Manufacturing Input Device 10

FIGS. 4A to 4E are cross-sectional views showing a method of manufacturing the input device according to Embodiment 1 of the invention. In FIGS. 4A to 4E, the light transmission electrode patterns, the crossing portions, and the metal wires are collectively shown, the left sides thereof show a portion corresponding to FIG. 3A, and the right sides thereof show a portion corresponding to FIG. 3B.

Figure 4A:
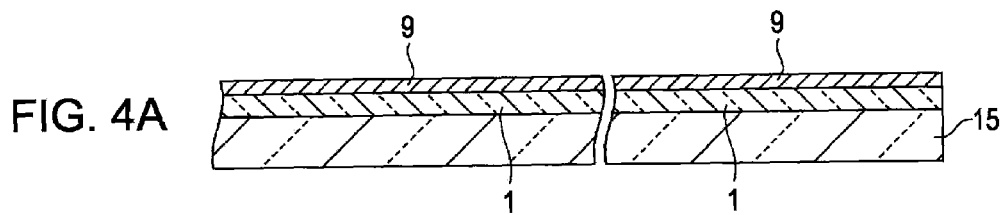
FIG. 4 is a cross-sectional view showing a method of manufacturing the input device according to Embodiment 1 of the invention.

In order to manufacture the input device 10 according to the present embodiment, first, as shown in FIG. 4A, a first polycrystal ITO film 1 having a thickness of 10 to 100 nm is formed on one whole surface of the light transmission substrate 15 (glass substrate) and a metal film 9 is then formed.

Figure 4B:
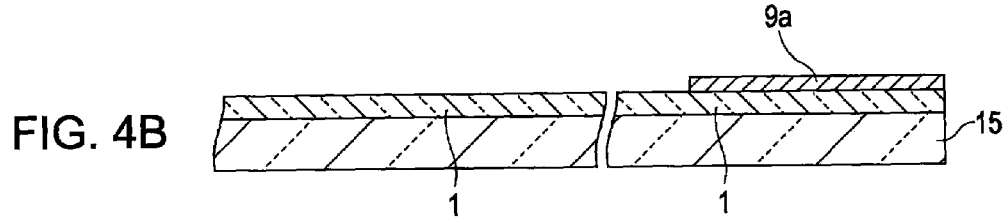

Next, the metal film is etched in a state in which an etching mask formed of photosensitive resin or the like is formed on the surface of the metal film, the metal wires 9a are patterned as shown in FIG. 4B, and then the etching mask is removed.

Figure 4C:
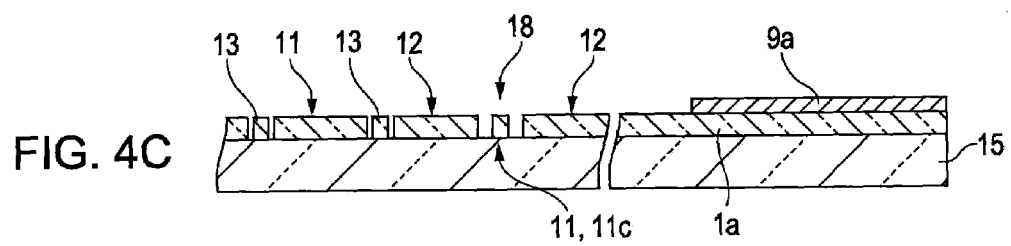

Next, the ITO film 1 is etched in a state in which an etching mask formed of photosensitive resin or the like is formed on the upper layer side of the metal wires 9a and the ITO film 1, as shown in FIG. 4C, the first light transmission electrode patterns 11, the second light transmission electrode patterns 12, and the dummy patterns 13 are patterned and the wire lead-out portion 1a from the first light transmission electrode patterns 11 and the second light transmission electrode patterns 12 is formed, and then the etching mask is removed. In the crossing portions 18 of the first light transmission electrode patterns 11 and the second light transmission electrode patterns 12 formed as above, the pad portions 11a of the first light transmission electrode patterns 11 are connected via the connection portions 11c, but the second light transmission electrode patterns 12 are disconnected.

Figure 4D:
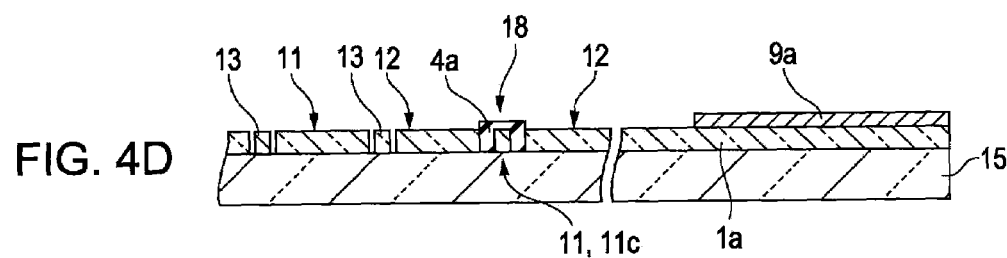

Next, acrylic resin is coated on the surfaces of the first light transmission electrode patterns 11, the second light transmission electrode patterns 12 and the dummy patterns 13 and is exposed and developed, and the interlayer insulating film 4a is formed so as to cover the connection portions 11c of the first light transmission electrode patterns 11, as shown in FIG. 4D.

Figure 4E:
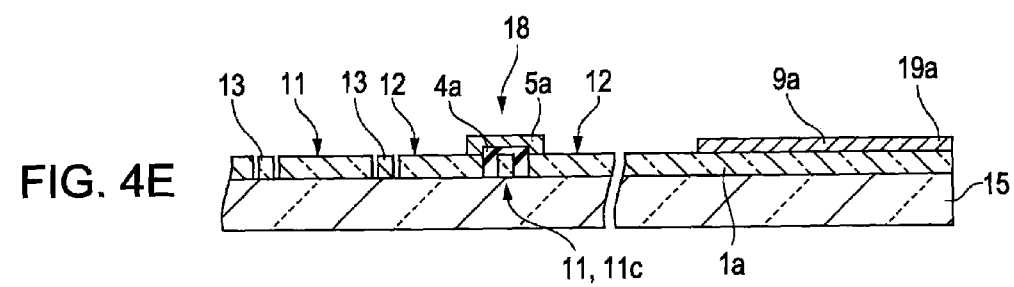

Next, an amorphous ITO film is formed on the upper layer side of the interlayer insulating film 4a, the ITO film is etched in a state in which an etching mask formed of photosensitive resin is formed on the surface of the ITO film, and, as shown in FIG. 4E, the relay electrodes 5a are formed on the interlayer insulating film 4a so as to connect the disconnection portions of the second light transmission electrode patterns 12. Thereafter, firing is performed under the condition of a temperature of 200° C. or more, for example, under the condition of the temperature of 220° C. and a time of 20 to 30 minutes such that the ITO film configuring the relay electrodes 5a becomes the polycrystal ITO film. Since the amorphous ITO film may be etched by oxalic acid or the like and oxalic acid does not etch the polycrystal ITO film, the first light transmission electrode patterns 11, the second light transmission electrode patterns 12 and the dummy patterns 13 are not damaged when the relay electrodes 5a are patterned. Since the ITO film configuring the relay electrodes 5a becomes the polycrystal ITO film by firing, it is possible to reduce the electrical resistance of the relay electrodes 5a.

Main Effect of Present Embodiment

As described above, in the input device 10 according to the present embodiment, when the light transmission substrate 15 is viewed from the top, the input region 10a includes the region in which the light transmission conductive film configuring the first light transmission electrode patterns 11 and the second light transmission electrode patterns 12 is present and the region in which this light transmission conductive film is not present, and there is a difference in reflectivity between these regions. Accordingly, the existence of the first light transmission electrode patterns 11 and the second light transmission electrode patterns 12 is conspicuous. However, in the present embodiment, in the gaps 14 in which the light transmission conductive film configuring the first light transmission electrode patterns 11 and the second light transmission electrode patterns 12 is not present, the dummy patterns 13 formed of the light transmission film having the same refractive index as the first light transmission electrode patterns 11 and the second light transmission electrode patterns 12 are formed. Accordingly, according to the present embodiment, since a region in which all the first light transmission electrode patterns 11, the second light transmission electrode patterns 12 and the dummy patterns 13 are not present is very narrow, the existence of the first light transmission electrode patterns 11 and the second light transmission electrode patterns 12 is inconspicuous.

In addition, in the present embodiment, since the first light transmission electrode patterns 11, the second light transmission electrode patterns 12 and the dummy patterns 13 are formed of the same light transmission conductive film on the same insulating film (on the light transmission substrate 15), the layer structures of the regions in which the first light transmission electrode patterns 11, the second light transmission electrode patterns 12 and the dummy patterns 13 are formed are equal, and thus there is no difference in reflectivity between the regions. Therefore, even when the liquid crystal device 50 is arranged so as to be overlapped on a side opposite to the input surface of the input device 10, it is possible to provide an image with high quality to a person who views the screen of the liquid crystal device 50 via the input device 10.

In particular, in the present embodiment, since the first light transmission electrode patterns 11 and the second light transmission electrode patterns 12 respectively include the large-area pad portions 11a and 12a, these patterns have the shapes which are apt to be conspicuous. However, if the present invention is applied, even when the first light transmission electrode patterns 11 and the second light transmission electrode patterns 12 having such shapes are formed, it is possible to prevent the patterns from being conspicuous with certainty.

In addition, in the present embodiment, in the gaps 14, the widths WS1 and WS2 of the spaces S1 and S2 of the ITO film configuring the first light transmission electrode patterns 11, the second light transmission electrode patterns 12 and the dummy patterns 13 are set to 30 μm or less and the sum WS of the widths WS1 and WS2 of the spaces S1 and S2 of the ITO film is set to 50 μm or less. Accordingly, in the gaps 14, the region in which the ITO film configuring the first light transmission electrode patterns 11, the second light transmission electrode patterns 12 and the dummy patterns 13 is not present is inconspicuous.

In the present embodiment, the dummy patterns 13 are in the electrically float state and the dummy patterns 13 are independently formed in the plurality of gaps 14. Accordingly, even when the dummy patterns 13 are provided between the first light transmission electrode patterns 11 and the second light transmission electrode patterns 12, the electrical influence of the dummy patterns 13 does not occur. Therefore, in the input device 10, detection sensitivity of the input position is high.

In addition, in the present embodiment, the first light transmission electrode patterns 11 and the second light transmission electrode patterns 12 are formed of a single layer film of the ITO film. The first light transmission electrode patterns 11 and the second light transmission electrode patterns 12 may be formed of a multi-layer film as the configuration in which the existence of the first light transmission electrode patterns 11 and the second light transmission electrode patterns 12 is inconspicuous. However, if such a configuration is employed, in many cases, an insulating film may be included in the multi-layer film and thus the conductive film becomes thin. Accordingly, the electrical resistance of the first light transmission electrode patterns 11 and the second light transmission electrode patterns 12 is increased. However, according to the present embodiment, even when the first light transmission electrode patterns 11 and the second light transmission electrode patterns 12 are formed of the single layer film, the existence of the first light transmission electrode patterns 11 and the second light transmission electrode patterns 12 is inconspicuous. Therefore, the electrical resistance of the first light transmission electrode patterns 11 and the second light transmission electrode patterns 12 can be decreased. In addition, since a manufacturing process can be simplified, cost can be also reduced.

In the present embodiment, since the first light transmission electrode patterns 11 and the second light transmission electrode patterns 12 are formed on the same surface of the light transmission substrate 15, it is possible to simplify the manufacturing process, compared with the case where the first light transmission electrode patterns 11 and the second light transmission electrode patterns 12 are respectively formed on the front surface and the rear surface of the light transmission substrate 15. In addition, since the first light transmission electrode patterns 11, the second light transmission electrode patterns 12 and the dummy patterns 13 are formed of the same light transmission conductive film on the same insulating layer (on the light transmission substrate 15), it is possible to simplify the manufacturing process, compared with the case where the first light transmission electrode patterns 11, the second light transmission electrode patterns 12 and the dummy patterns 13 are formed by different layers.

When the first light transmission electrode patterns 11 and the second light transmission electrode patterns 12 are formed by the same layer on the same surface of the light transmission substrate 15, the first light transmission electrode patterns 11 and the second light transmission electrode patterns 12 need to cross each other, and the film configuration of such crossing portions 18 are different from that of the first light transmission electrode patterns 11 and the second light transmission electrode patterns 12. Accordingly, even when the existence of the first light transmission electrode patterns 11 and the second light transmission electrode patterns 12 is inconspicuous, the existence of the crossing portions 18 is conspicuous. However, in the present embodiment, since the configuration in which the disconnection portions of the second light transmission electrode patterns 12 are electrically connected by the relay electrodes 5a formed on the interlayer insulating film 4a is employed and the relay electrodes 5a and the connection portions 11c located at the crossing portions 18 in the first light transmission electrode patterns 11 have a narrow width, the area occupied by the crossing portions 18 is small. Therefore, according to the invention, since the existence of the crossing portions 18 is inconspicuous when being viewed from the input surface 10b of the input device 10, the quality of the image is high when the image displayed by the liquid crystal device 50 or the like is viewed from the input surface 10b of the input device 10.

Embodiment 2

Figure 5:
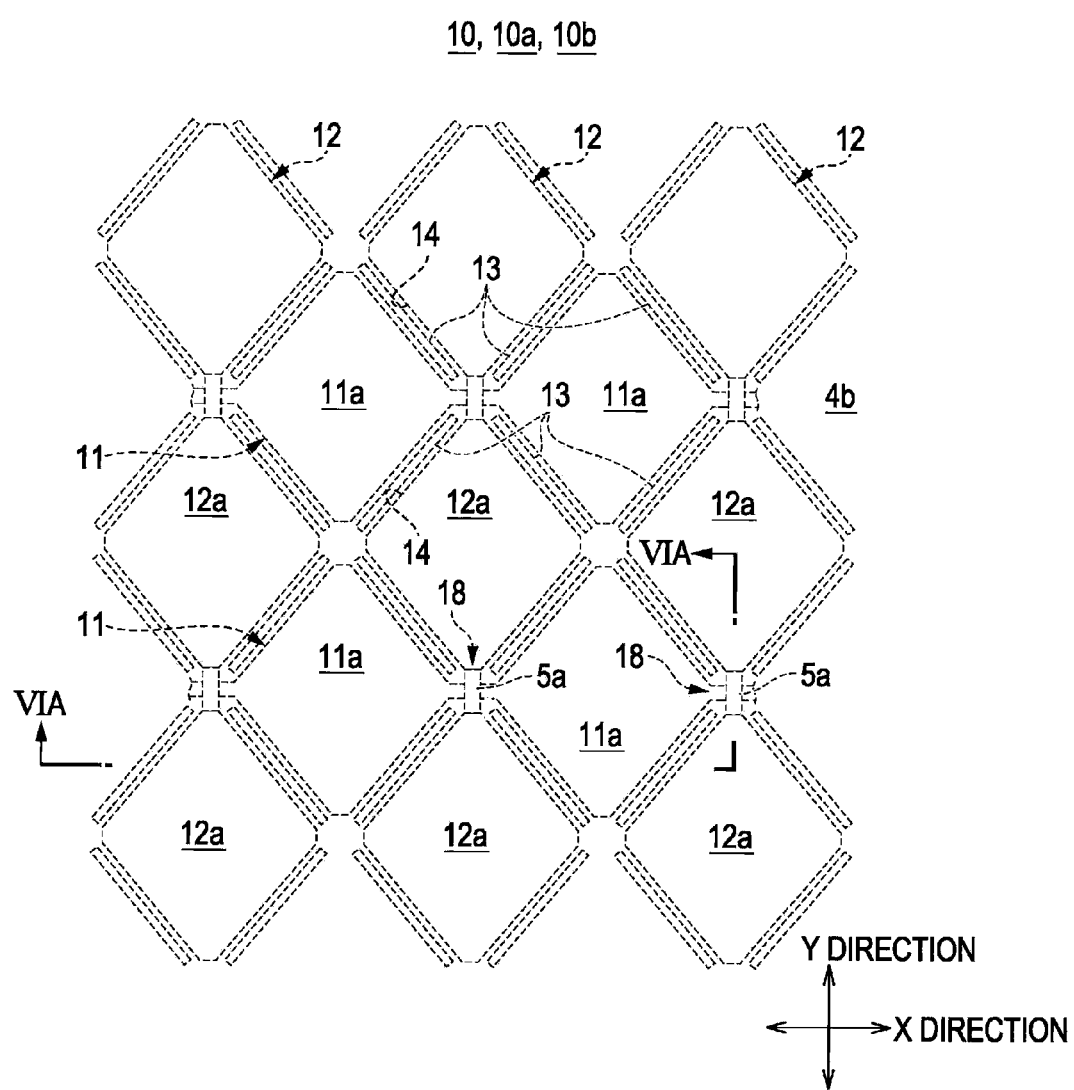
FIG. 5 is an explanation view showing the planar configuration of first light transmission electrode patterns and second light transmission electrode patterns formed in an input device according to Embodiment 2 of the invention.
Figure 6A:
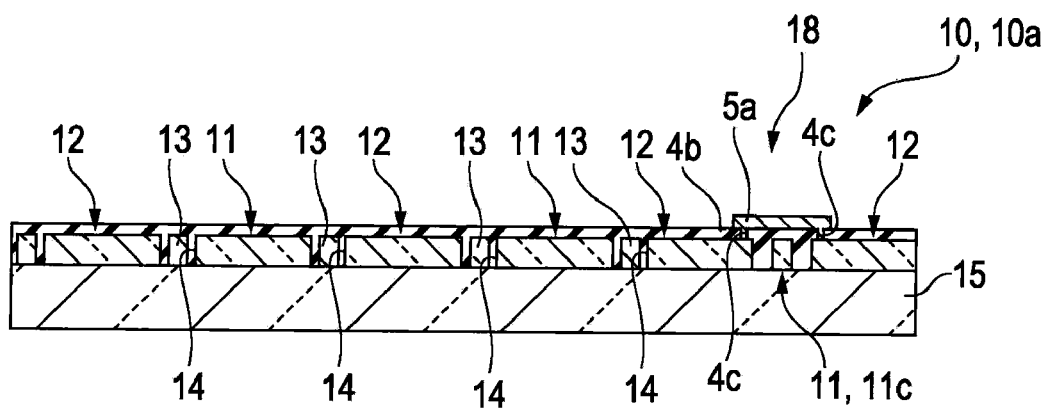
FIGS. 6A and 6B are cross-sectional views taken along line VIA-VIA according to Embodiment 2 of the invention and a cross-sectional view showing a connection structure of light transmission electrode patterns and metal wires, respectively.
Figure 6B:
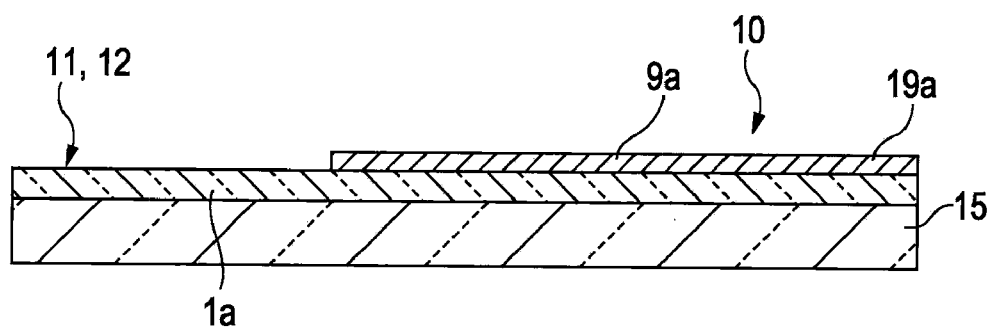

FIG. 5 is an explanation view showing the planar configuration of first light transmission electrode patterns and second light transmission electrode patterns formed in an input device according to Embodiment 2 of the invention. FIGS. 6A and 6B are cross-sectional views taken along line VIA-VIA of FIG. 5 according to Embodiment 2 of the invention and a cross-sectional view showing a connection structure of light transmission electrode patterns and metal wires, respectively. Since the basic configuration of the present embodiment is equal to that of Embodiment 1, the same portions are denoted by the same reference numerals and the description thereof will be omitted.

In FIGS. 5 and 6A, the input device 10 according to the present embodiment is a capacitance type touch panel like Embodiment 1, and, in an input surface 10b of a light transmission substrate 15, a plurality of rows of first light transmission electrode patterns 11 extending in a first direction and a plurality of rows of second light transmission electrode patterns 12 extending in a second direction crossing the first direction are formed in an input region 10a.

Even in the present embodiment, like Embodiment 1, the first light transmission electrode patterns 11 and the second light transmission electrode patterns 12 respectively include large-area pad portions 11a and 12a (large-area portions) having a rhombic shape in regions sandwiched between crossing portions 18, and dummy patterns 13 formed of an ITO film which is simultaneously formed with the first light transmission electrode patterns 11 and the second light transmission electrode patterns 12 are formed in gaps 14 sandwiched between such pad portions 11a and 12a.

In the present embodiment, in the crossing portions 18 of the first light transmission electrode patterns 11 and the second light transmission electrode patterns 12, the first light transmission electrode patterns 11 are connected, but the second light transmission electrode patterns 12 are disconnected.

A light transmission interlayer insulating film 4b is formed on the upper layer side of the first light transmission electrode patterns 11 and the second light transmission electrode patterns 12 over the substantial whole input region 10a, and light transmission relay electrodes 5a for electrically connecting the second light transmission electrode patterns 12, which are disconnected at the crossing portions 18, via contact holes 4c of the interlayer insulating film 4b are formed on such an interlayer insulating film 4b. Accordingly, the second light transmission electrode patterns 12 are electrically connected in the second direction. Such relay electrodes 5a are also formed so as to have a rectangular shape and have a width narrower than that of the pad portions 12a of the second light transmission electrode patterns 12, like Embodiment 1.

As shown in FIG. 6B, even in the present embodiment, like Embodiment 1, in the outer region of the input region 10a of the light transmission substrate 15, a wire lead-out portion 1a extends from the first light transmission electrode patterns 11 and the second light transmission electrode patterns 12, and metal wires 9a are formed on the wire lead-out portion 1a. Ends of the metal wires 9a configure a terminal 19a for connecting the flexible substrate 19.

Method of Manufacturing Input Device 10

FIGS. 7A to 7E are cross-sectional views showing a method of manufacturing the input device according to Embodiment 2 of the invention. In FIGS. 7A to 7E, the light transmission electrode patterns, the crossing portions, and the metal wires are collectively shown, the left sides thereof show a portion corresponding to FIG. 6A, and the right sides thereof show a portion corresponding to FIG. 6B.

Figure 7A:
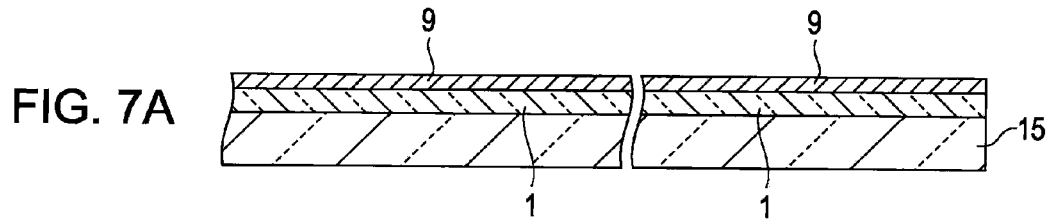
FIG. 7 is a cross-sectional view showing a method of manufacturing the input device according to Embodiment 2 of the invention.

In order to manufacture the input device 10 according to the present embodiment, first, as shown in FIG. 7A, a polycrystal ITO film 1 having a thickness of 10 to 100 nm is formed on one whole surface of the light transmission substrate 15 (glass substrate) and a metal film 9 is then formed.

Figure 7B:
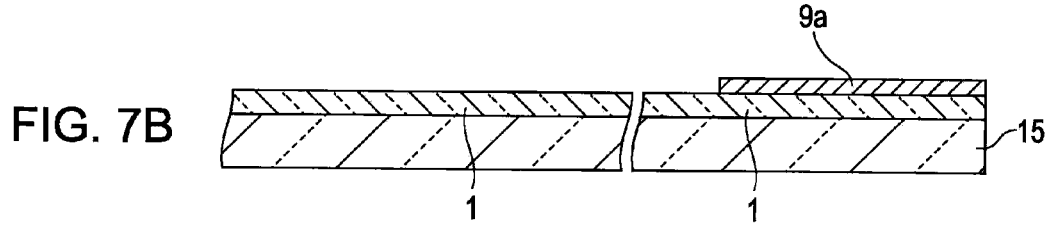

Next, the metal film is etched in a state in which an etching mask formed of photosensitive resin or the like is formed on the surface of the metal film 9, the metal wires 9a are patterned as shown in FIG. 7B, and then the etching mask is removed.

Figure 7C:
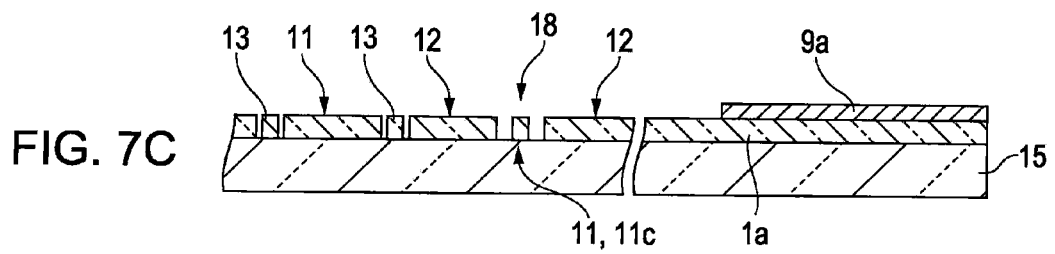

Next, the ITO film 1 is etched in a state in which an etching mask formed of photosensitive resin or the like is formed on the upper layer side of the metal wires 9a and so on, as shown in FIG. 7C, the first light transmission electrode patterns 11, the second light transmission electrode patterns 12, the dummy patterns 13 and the wire lead-out portion 1a are patterned, and then the etching mask is removed.

Figure 7D:
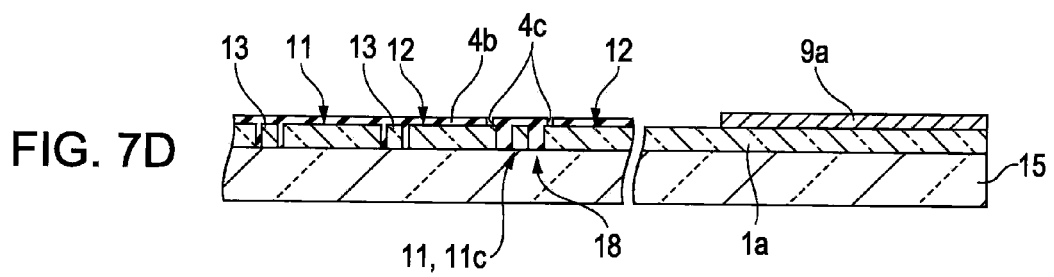

Next, acrylic resin is coated on the surfaces of the first light transmission electrode patterns 11 and the second light transmission electrode patterns 12 and is exposed and developed, and the interlayer insulating film 4b is formed so as to overlap with the first light transmission electrode patterns 11, the second light transmission electrode patterns 12 and the crossing portions 18, as shown in FIG. 7D. At this time, the contact holes 4c are simultaneously formed in the interlayer insulating film 4b.

Figure 7E:
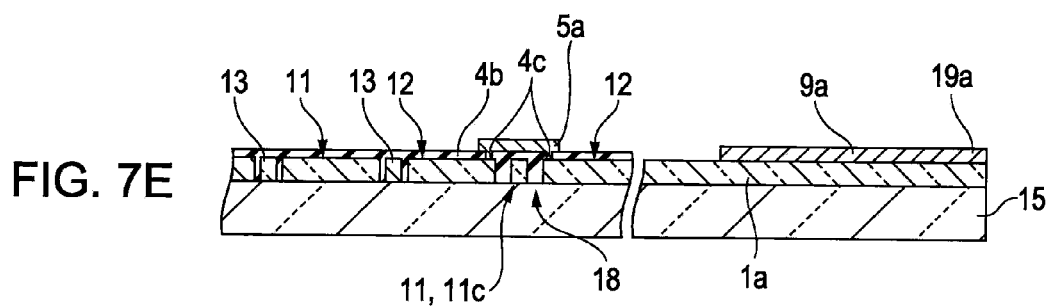

Next, a polycrystal ITO film is formed on the upper layer side of the interlayer insulating film 4b, the ITO film is etched in a state in which an etching mask formed of photosensitive resin is formed on the surface of the ITO film, and, as shown in FIG. 7E, the relay electrodes 5a are formed. At this time, since the first light transmission electrode patterns 11 and the second light transmission electrode patterns 12 are covered by the interlayer insulating film 4b, the first light transmission electrode patterns 11 and the second light transmission electrode patterns 12 are not damaged. Instead of the polycrystal ITO film, an amorphous ITO film may be formed, be etched by oxalic acid in a state in which an etching mask formed of photosensitive resin or the like is formed, be annealed after the pattern is formed, and be changed to the polycrystal ITO film.

Main Effect of Present Embodiment

As described above, even in the present embodiment, like Embodiment 1, in the gaps 14 in which the light transmission conductive film configuring the first light transmission electrode patterns 11 and the second light transmission electrode patterns 12 is not present, the dummy patterns 13 formed of the light transmission film having the same refractive index as the first light transmission electrode patterns 11 and the second light transmission electrode patterns 12 are formed. Accordingly, since a region in which all the first light transmission electrode patterns 11, the second light transmission electrode patterns 12 and the dummy patterns 13 are not present is very narrow, the existence of the first light transmission electrode patterns 11 and the second light transmission electrode patterns 12 is inconspicuous, that is, the same effect as Embodiment 1 is obtained.

Embodiment 3

Figure 8:
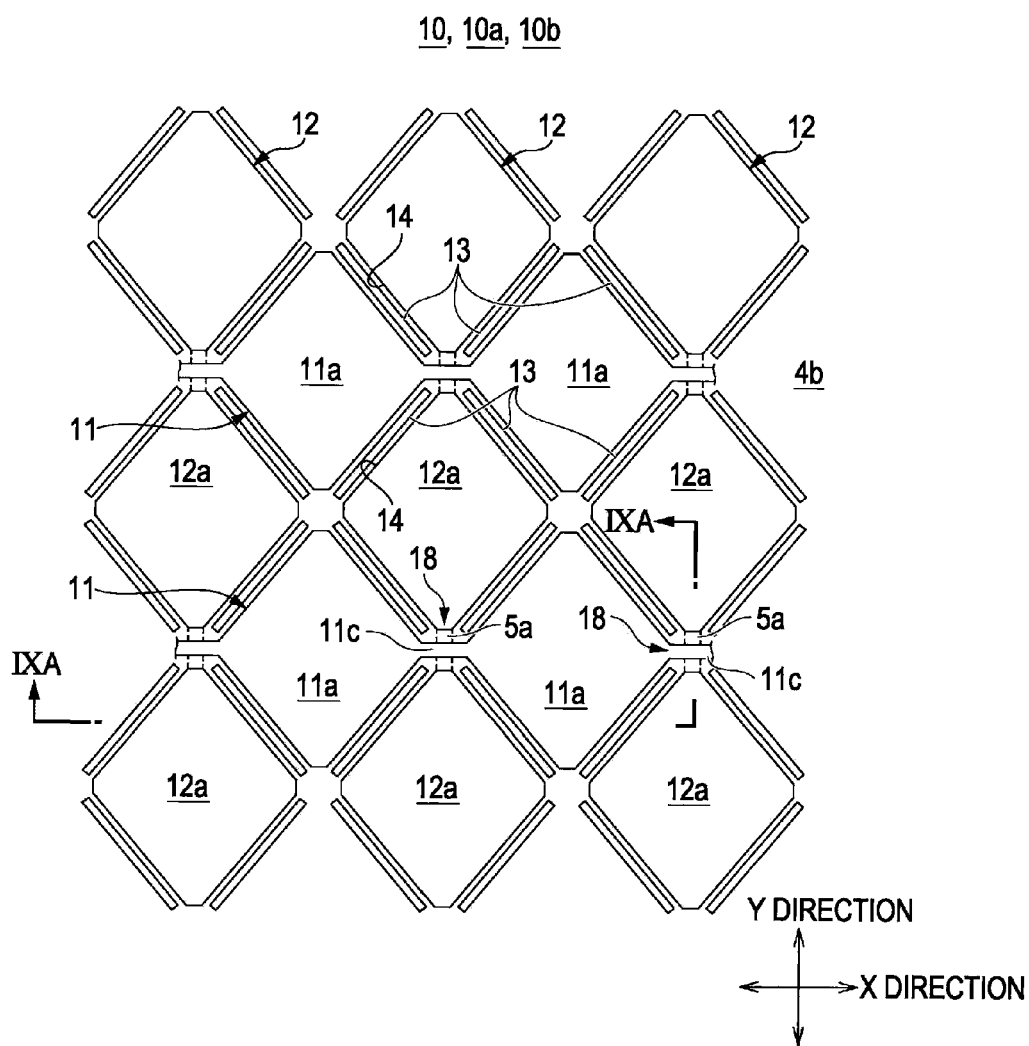
FIG. 8 is an explanation view showing the planar configuration of first light transmission electrode patterns and second light transmission electrode patterns formed in an input device according to Embodiment 3 of the invention.
Figure 9A:
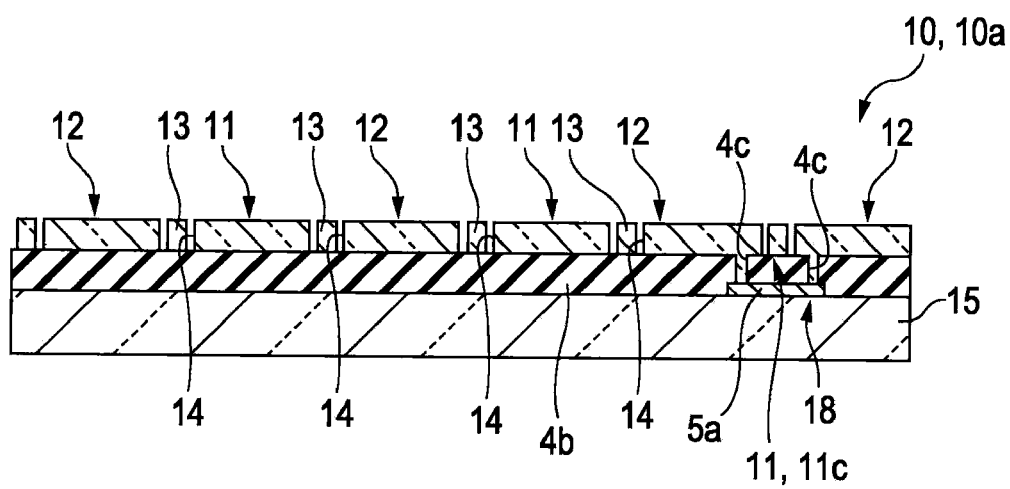
FIGS. 9A and 9B are cross-sectional views taken along line IXA-IXA according to Embodiment 3 of the invention and a cross-sectional view showing a connection structure of light transmission electrode patterns and metal wires, respectively.
Figure 9B:
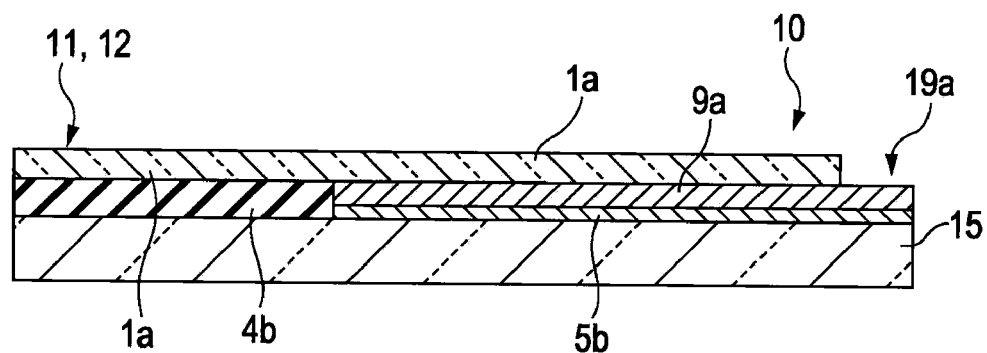

FIG. 8 is an explanation view showing the planar configuration of first light transmission electrode patterns and second light transmission electrode patterns formed in an input device according to Embodiment 3 of the invention. FIGS. 9A and 9B are cross-sectional views taken along line IXA-IXA of FIG. 8 according to Embodiment 3 of the invention and a cross-sectional view showing a connection structure of a light transmission electrode pattern and a metal wire, respectively. Since the basic configuration of the present embodiment is equal to that of Embodiment 1, the same portions are denoted by the same reference numerals and the description thereof will be omitted.

In FIGS. 8 and 9A, the input device 10 according to the present embodiment is a capacitance type touch panel like Embodiment 1, and, in an input surface 10b of a light transmission substrate 15, a plurality of rows of first light transmission electrode patterns 11 extending in a first direction and a plurality of rows of second light transmission electrode patterns 12 extending in a second direction crossing the first direction are formed in an input region 10a.

Even in the present embodiment, like Embodiment 1, the first light transmission electrode patterns 11 and the second light transmission electrode patterns 12 respectively include large-area pad portions 11a and 12a (large-area portions) having a rhombic shape in regions sandwiched between crossing portions 18, and dummy patterns 13 formed of an ITO film which is simultaneously formed with the first light transmission electrode patterns 11 and the second light transmission electrode patterns 12 are formed in gaps 14 sandwiched between such pad portions 11a and 12a.

In the present embodiment, in the crossing portions 18 of the first light transmission electrode patterns 11 and the second light transmission electrode patterns 12, the first light transmission electrode patterns 11 are connected, but the second light transmission electrode patterns 12 are disconnected.

A light transmission interlayer insulating film 4b is formed on the lower layer side of the first light transmission electrode patterns 11 and the second light transmission electrode patterns 12 over the substantial whole input region 10a, and light transmission relay electrodes 5a for electrically connecting the second light transmission electrode patterns 12, which are disconnected at the crossing portions 18, via contact holes 4c of the interlayer insulating film 4b are formed under such an interlayer insulating film 4b. Accordingly, the second light transmission electrode patterns 12 are electrically connected in the second direction. Such relay electrodes 5a are also formed so as to have a rectangular shape and have a width narrower than that of the pad portions 12a of the second light transmission electrode patterns 12, like Embodiment 1.

As shown in FIG. 9B, in the present embodiment, in the outer region of the input region 10a of the light transmission substrate 15, a wire lead-out portion 1a extends from the first light transmission electrode patterns 11 and the second light transmission electrode patterns 12, and metal wires 9a are formed under the wire lead-out portion 1a. Wires 5b which are formed of an ITO film and are simultaneously formed with the relay electrodes 5a are formed under the metal wires 9a.

Method of Manufacturing Input Device 10

FIGS. 1A to 10E are cross-sectional views showing a method of manufacturing the input device according to Embodiment 3 of the invention. In FIGS. 10A to 10E, the light transmission electrode patterns, the crossing portions, and the metal wires are collectively shown, the left sides thereof show a portion corresponding to FIG. 9A, and the right sides thereof show a portion corresponding to FIG. 9B.

Figure 10A:
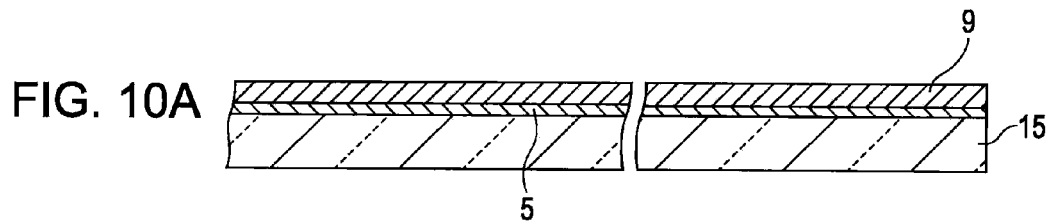
FIG. 10 is a cross-sectional view showing a method of manufacturing the input device according to Embodiment 3 of the invention.

In order to manufacture the input device 10 according to the present embodiment, first, as shown in FIG. 10A, a polycrystal ITO film 5 having a thickness of 10 to 100 nm is formed on one whole surface of the light transmission substrate 15 (glass substrate) and a metal film 9 is then formed.

Figure 10B:
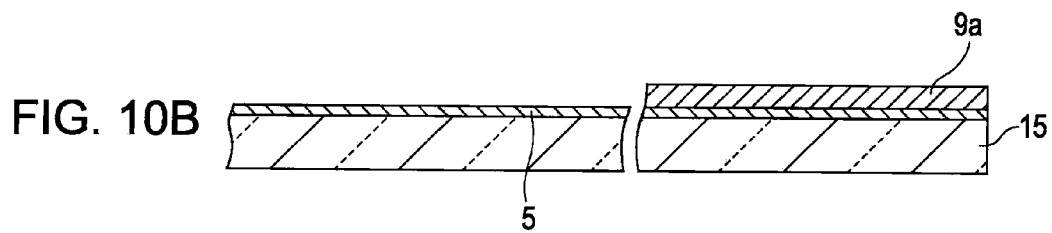

Next, the metal film is etched in a state in which an etching mask formed of photosensitive resin or the like is formed on the surface of the metal film 9, the metal wires 9a are patterned as shown in FIG. 10B, and then the etching mask is removed.

Figure 10C:
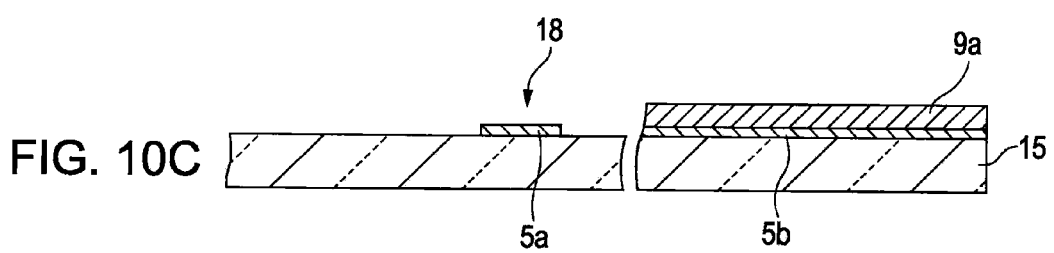

Next, the ITO film 5 is etched in a state in which an etching mask formed of photosensitive resin or the like is formed on the upper layer side of the metal wires 9a and so on, and, as shown in FIG. 10C, the relay electrodes 5a are formed. At this time, the wires 5b are patterned. Thereafter, the etching mask is removed.

Figure 10D:
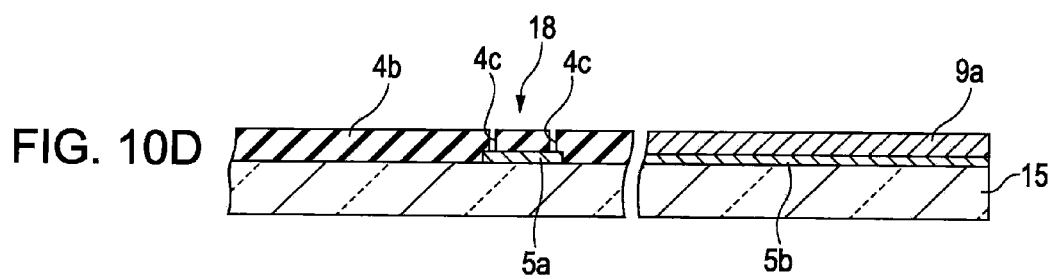

Next, acrylic resin is coated on the surfaces of the relay electrodes 5a and is exposed and developed, and the interlayer insulating film 4b is formed, as shown in FIG. 10D. At this time, the contact holes 4c are simultaneously formed in the interlayer insulating film 4b. In addition, the interlayer insulating film 4b is not formed in the outer region of the input region 10a of the light transmission substrate 15.

Figure 10E:
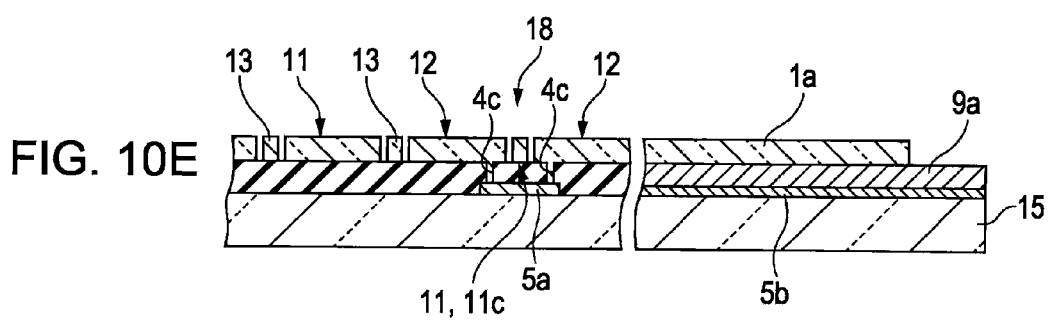

Next, a polycrystal ITO film is formed on the upper layer side of the interlayer insulating film 4b, the ITO film is etched in a state in which an etching mask formed of photosensitive resin is formed on the surface of the ITO film, and, as shown in FIG. 10E, the first light transmission electrode patterns 11, the second light transmission electrode patterns 12, the dummy patterns 13 and the wire lead-out portion 1a are patterned and then the etching mask is removed. Instead of the polycrystal ITO film, an amorphous ITO film may be formed, be etched by oxalic acid in a state in which an etching mask formed of photosensitive resin or the like is formed, be annealed after the pattern is formed, and be changed to the polycrystal ITO film.

Main Effect of Present Embodiment

As described above, even in the present embodiment, like Embodiment 1, in the gaps 14 in which the light transmission conductive film configuring the first light transmission electrode patterns 11 and the second light transmission electrode patterns 12 is not present, the dummy patterns 13 formed of the light transmission film having the same refractive index as the first light transmission electrode patterns 11 and the second light transmission electrode patterns 12 are formed. Accordingly, since a region in which all the first light transmission electrode patterns 11, the second light transmission electrode patterns 12 and the dummy patterns 13 are not present is very narrow, the existence of the first light transmission electrode patterns 11 and the second light transmission electrode patterns 12 is inconspicuous, that is, the same effect as Embodiment 1 is obtained.

Other Configuration Example of Dummy Patterns 13

Figure 11A:
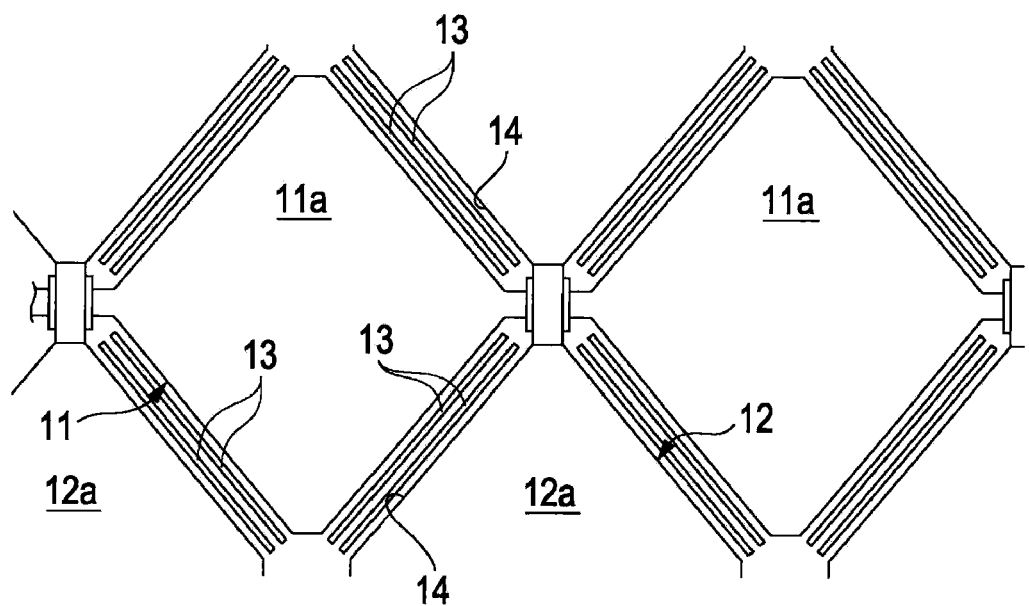
FIGS. 11A and 11B are plan views showing other configuration examples of dummy patterns formed in the input device according to the invention.
Figure 11B:
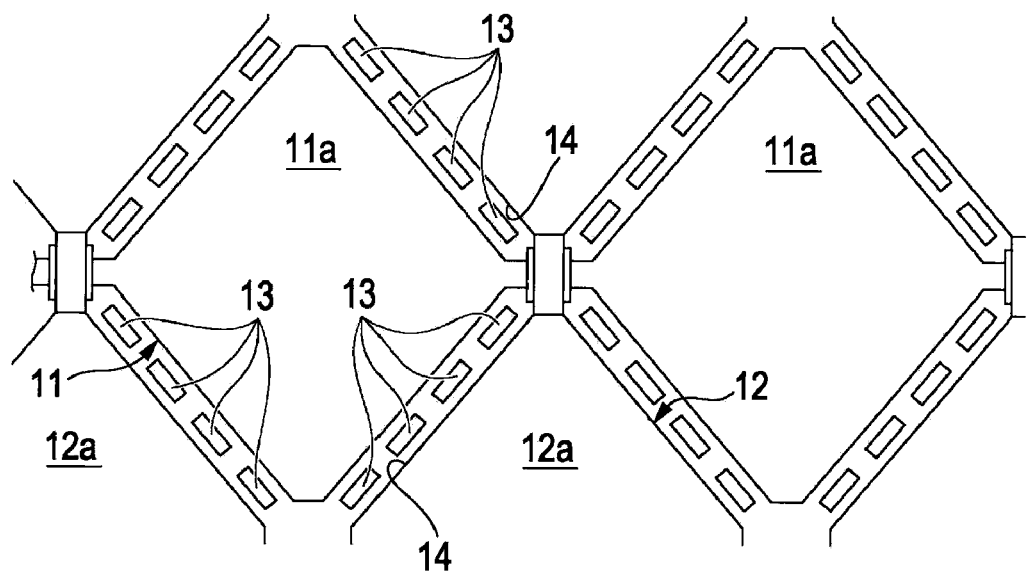

FIGS. 11A and 11B are plan views showing other configuration examples of dummy patterns 13 formed in the input device 10 according to the invention.

Although the dummy patterns 13 are formed in the gaps 14 sandwiched between the pad portions 11a and 12a of the first light transmission electrode patterns 11 and the second light transmission electrode patterns 12 as one linear pattern in Embodiments 1 to 3, as shown in FIG. 11A, a configuration in which two dummy patterns 13 extend in each of the gaps 14 in the longitudinal direction of each of the gaps 14 in a state of being parallel to each other in the width direction of the gaps 14 may be employed. If such a configuration is employed, in the width direction of the gaps 14, the width of the spaces formed between the pad portions 11a and 12a and the dummy patterns 13 can be easily set to 30 µm or less and the sum of the widths of the spaces can be easily set to 50 µm or less. If a plurality of dummy patterns 13 are parallel to each other in each of the gaps 14, parasitic capacitance between the first light transmission electrode patterns 11 and the second light transmission electrode patterns 12 is smaller than that of the case where one dummy pattern 13 is formed. Therefore, in the input device 10, detection sensitivity of the input position can be increased. In addition, although the two dummy patterns 13 are parallel to each other in each of the gaps 14 in FIG. 11A, a configuration in which three or more dummy patterns 13 are parallel to each other may be employed.

Although the dummy patterns 13 are formed in the gaps 14 sandwiched between the pad portions 11a and 12a of the first light transmission electrode patterns 11 and the second light transmission electrode patterns 12 as linear pattern in Embodiments 1 to 3, as shown in FIG. 11B, a configuration in which the dummy pattern 13 in one gap 14 is divided in the longitudinal direction of the gap 14 may be employed. In such a configuration, since the electrical influence of the dummy pattern 13 is small compared with the case where the dummy pattern 13 extends, the detection sensitivity of the input position can be increased. Even in such a case, it is preferable that the widths of the spaces formed between the pad portions 11a and 12a and the dummy patterns 13 in the width direction of the gaps 14 is set to 30 µm or less and the sum of the widths of the spaces is set to 50 µm or less. In addition, it is preferable that the gap between the divided dummy patterns 13 is set to 30 µm or less. In such a configuration, the region in which the ITO film configuring the first light transmission electrode patterns 11, the second light transmission electrode patterns 12 and the dummy patterns 13 is not present is inconspicuous.

Other Embodiments

Although the ends of the metal wires 9a are used as the terminal 19a in Embodiments 1 and 2, an ITO layer may be simultaneously formed on the ends of the metal wires 9a with the relay electrodes 5a and may be used as the terminal 19a. Although the interlayer insulating film 4b is formed only on the input region 10a in Embodiments 2 and 3, the interlayer insulating film 4b may be formed on the substantial whole surface excluding the surface of the terminal 19a.

Although the first light transmission electrode patterns 11, the second light transmission electrode patterns 12 and the dummy patterns 13 are formed of the ITO film in Embodiments 1 to 3, they may be formed of a light transmission conductive metal oxide film such as indium zinc oxide (IZO) or the like.

Although the dummy patterns 13 are formed of the ITO film similar to the first light transmission electrode patterns 11 and the second light transmission electrode patterns 12 in Embodiments 1 to 3, with respect to the dummy patterns 13, if the light transmission material having the same refractive index as the first light transmission electrode patterns 11 and the second light transmission electrode patterns 12 is used, a light transmission conductive film which is different from the first light transmission electrode patterns 11 and the second light transmission electrode patterns 12 in the kind of the material and the thickness may be used or a light transmission insulating film may be used. Since there is no possibility that the dummy patterns 13 is short-circuited to the first light transmission electrode patterns 11 and the second light transmission electrode patterns 12 in case of light transmission insulating film, the gaps 14 may be completely filled up by the dummy patterns 13 in plan view. That is, the ends of the dummy patterns 13 and the ends of the first light transmission electrode patterns 11 and the second light transmission electrode patterns 12 may be aligned to be identical. By this configuration, in the gaps 14, the region in which the ITO film of the first light transmission electrode patterns 11 and the second light transmission electrode patterns 12 is not present is substantially inconspicuous.

Although the first light transmission electrode patterns 11, the second light transmission electrode patterns 12 and the dummy patterns 13 are formed of the same light transmission conductive film on the same insulating layer at the same surface side of the light transmission substrate 15 in Embodiments 1 to 3, the invention is applicable to the case where the dummy patterns 13 may be formed on an insulating layer different from the insulating layer, on which the first light transmission electrode patterns 11 and the second light transmission electrode patterns 12 are formed, at the same surface side of the light transmission substrate 15 or the case the first light transmission electrode patterns 11 and the second light transmission electrode patterns 12 are formed on different insulating layers at the same surface side of the light transmission substrate 15. In addition, the invention is applicable to the case the first light transmission electrode patterns 11 and the second light transmission electrode patterns 12 are formed on the different surface sides of the light transmission substrate 15. In the case where the dummy patterns 13 are arranged between the first light transmission electrode patterns 11 and the second light transmission electrode patterns 12 with the insulating layer interposed therebetween, since there is no possibility that the dummy patterns 13 are short-circuited to the first light transmission electrode patterns 11 and the second light transmission electrode patterns 12, the gaps 14 may be completely filled up by the dummy patterns 13 in plan view. That is, the ends of the dummy patterns 13 and the ends of the first light transmission electrode patterns 11 and the second light transmission electrode patterns 12 may be aligned to be identical. By this configuration, in the gaps 14, the region in which the ITO film of the first light transmission electrode patterns 11 and the second light transmission electrode patterns 12 is not present is substantially inconspicuous. In this case, in the gaps 14, since the dummy patterns 13 and the first light transmission electrode patterns 11 and the second light transmission electrode patterns 12 are close to each other in plan view, parasitic capacitance between the first light transmission electrode patterns 11 and the second light transmission electrode patterns 12 may be increased. However, if the insulating layer is interposed between the patterns, the distance between the patterns is maintained and thus the parasitic capacitance can be decreased. Therefore, in the input device 10, the detection sensitivity of the input position can be increased.

Although the liquid crystal device 50 is used as the image generating device in the above-described embodiments, an organic electroluminescence device or a plasma display device may be used as the image generating device.

Example of Mounting in Electronic Apparatus

Figure 12A:
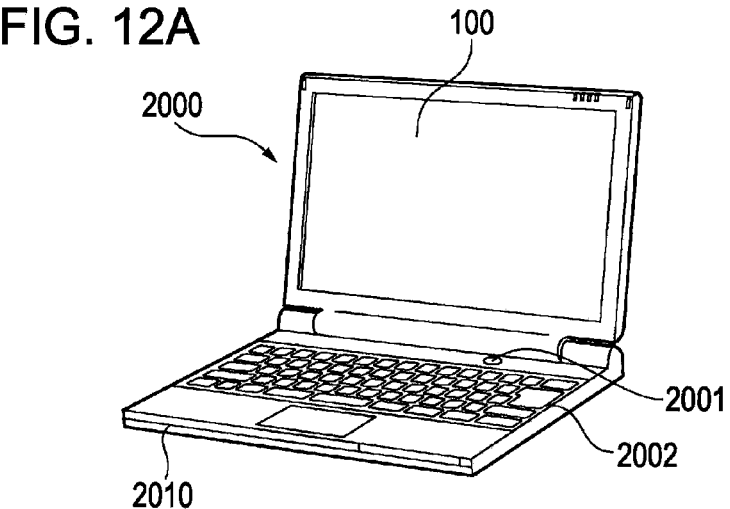
FIG. 12 is an explanation view of an electronic apparatus using a display device with an input device according to the invention.
Figure 12B:
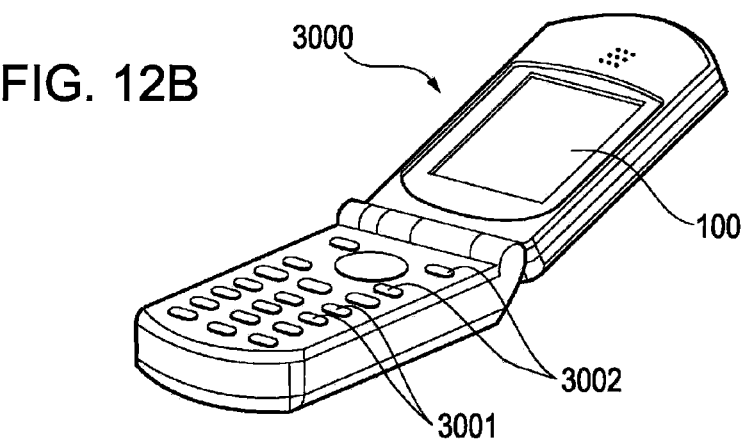
Figure 12C:
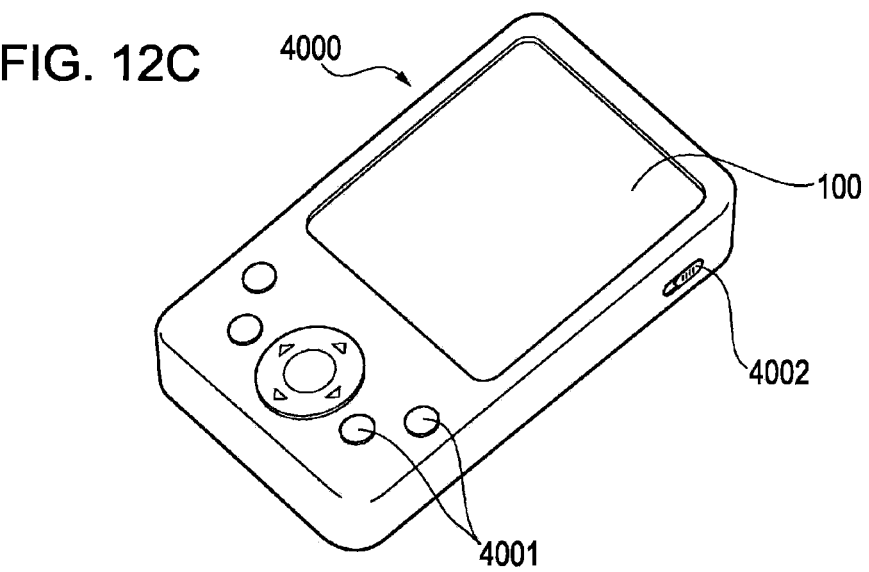

Next, an electronic apparatus to which the display device 100 with the input device according to the above-described embodiments is applied will be described. FIG. 12A shows the configuration of a mobile personal computer including the display device 100 with the input device. The personal computer 2000 includes the display device 100 with the input device as a display unit and a main body 2010. In the main body 2010, a power switch 2001 and a keyboard 2002 are provided. FIG. 12B shows the configuration of a mobile telephone including the display device 100 with the input device. The mobile telephone 3000 includes a plurality of operation buttons 3001, a scroll button 3002 and the display device 100 with the input device as a display unit. By operating the scroll button 3002, the screen displayed by the display device 100 with the input device is scrolled. FIG. 12C shows the configuration of a personal digital assistant (PDA) to which the display device 100 with the input device is applied. The PDA 4000 includes a plurality of operation buttons 4001, a power switch 4002, and the display device 100 with the input device as a display unit. When the power switch 4002 is operated, a variety of information including an address book or a schedule book is displayed on the display device 100 with the input device.

As the electronic apparatus to which the display device 100 with the input device is applied, in addition to the electronic apparatuses shown in FIG. 12, there are a digital still camera, a liquid crystal TV set, a viewfinder-type or direct-view monitor type video tape recorder, a car navigation system, a pager, an electronic organizer, an electronic calculator, a word processor, a workstation, a videophone, a POS terminal, a touch-panel-equipped device and the like. The above-described display device 100 with the input device is applicable as the display units of various types of electronic apparatuses.

What is claimed is:

1. A capacitance type input device comprising:
   a plurality of first light transmission electrodes extending in a first direction and a plurality of second light transmission electrodes extending in a second direction crossing the first direction are formed in an input region of a light transmission substrate,
   wherein, when the light transmission substrate is viewed from the top, the first light transmission electrodes include first large-area portions and the second light transmission electrodes include second large-area portions in regions sandwiched between crossing portions of the first light transmission electrodes and the second light transmission electrodes, respectively,
   a plurality of slit-shaped gaps sandwiched between the first large-area portions and the second large-area portions are formed between the first light transmission electrodes and the second light transmission electrodes, each gap extending longitudinally between one first large-area portion and one second large-area portion,
   at least two dummy patterns are formed in each of the gaps, and the first light transmission electrodes, the second light transmission electrodes, and the dummy patterns are formed of the same light transmission conductive film, which is formed of a single layer film on a single insulating layer, at the same surface side of the light transmission substrate, and
   a plurality of light transmission relay electrodes are formed in the crossing portions between one of (i) the first large-area portions of the first light transmission electrodes and (ii) the second large-area portions of the second light transmission electrodes,
   wherein the first light transmission electrodes and the second light transmission electrodes have a first thickness of 10 nm to 100 nm, and
   wherein plurality of light transmission relay electrodes are formed of tin indium oxide having a second thickness of 10 nm to 50 nm.

2. The capacitance type input device according to claim 1, wherein:
   the dummy patterns are formed in a state of being insulated from both the first light transmission electrodes and the second light transmission electrodes.

3. The capacitance type input device according to claim 1, wherein the dummy patterns are independently formed in each of the plurality of gaps.

4. The capacitance type input device according to claim 1, wherein a plurality of dummy patterns extend in each of the gaps in the longitudinal direction of the gaps in a state of being parallel to each other in the width direction of the gaps.

5. The capacitance type input device according to claim 1, wherein a plurality of dummy patterns are arranged in one of the slit-shaped gaps in a state of being divided in the longitudinal direction of the gaps.

6. The capacitance type input device according to claim 1, wherein, in the width direction of the gaps, the widths of spaces formed between the large-area portions and the dummy patterns are 30 μm or less and the sum of the widths of the spaces is 50 μm or less.

7. The capacitance type input device according to claim 1, wherein, in the crossing portions, ones of the first light transmission electrodes and the second light transmission electrodes are connected to each other and the others thereof are disconnected from each other,
   a light transmission interlayer insulating film is formed on an upper layer side or a lower layer side of ones of the first light transmission electrodes and the second light transmission electrodes in at least the crossing portions, and
   at a side opposite to a side, on which the first light transmission electrodes and the second light transmission electrodes are formed, of the upper layer side and the lower layer side of the interlayer insulating film, light transmission relay electrodes for electrically connecting the others of the first light transmission electrodes and the second light transmission electrodes, which are disconnected in the crossing portions, are formed.

8. A display device with an input function, the display device comprising the capacitance type input device according to claim 1,
wherein an image generating device is arranged so as to be overlapped on a side opposite to an input surface of the capacitance type input device.

9. The capacitance type input device according to claim 1, wherein the first large-area portions and the second large-area portions have a rhombic shape with unequal axes.

10. The capacitance type input device according to claim 1, wherein the single layer light transmissive conductive film, including the first light transmission electrodes, the second light transmission electrodes, and the dummy patterns, is simultaneously formed on the single insulating layer.

11. The capacitance type input device according to claim 1, wherein the first light transmission electrodes, the second light transmission electrodes, and the dummy patterns are formed with the same reflectivity, and a region formed without the first light transmission electrodes, the second light transmission electrodes, and the dummy patterns, is formed in the input region with a small difference in reflectivity to the first light transmission electrodes, the second light transmission electrodes, and the dummy patterns.

* * * * *